United States Patent
Ezra

(10) Patent No.: US 10,487,681 B1
(45) Date of Patent: Nov. 26, 2019

(54) VARIABLE GEOMETRY TURBOCHARGER ADJUSTMENT DEVICE

(71) Applicant: Eyal Ezra, Jersey City, NJ (US)

(72) Inventor: Eyal Ezra, Jersey City, NJ (US)

( * ) Notice: Subject to any disclaimer, the term of this patent is extended or adjusted under 35 U.S.C. 154(b) by 0 days.

(21) Appl. No.: 16/056,800

(22) Filed: Aug. 7, 2018

(51) Int. Cl.
*F01D 17/16* (2006.01)
*F02B 37/24* (2006.01)

(52) U.S. Cl.
CPC ............ *F01D 17/165* (2013.01); *F02B 37/24* (2013.01); *F05D 2220/40* (2013.01); *F05D 2240/128* (2013.01)

(58) Field of Classification Search
CPC ........ F01D 17/165; F02B 37/24; F02B 37/00; F02B 37/225; F04D 17/10; F04D 25/04; F04D 27/002; F04D 27/0246; F04D 27/0253; F04D 29/4213; F04D 29/464; F04D 29/681; F05D 2240/128; F05D 2240/40
USPC .......................................................... 60/602
See application file for complete search history.

(56) References Cited

U.S. PATENT DOCUMENTS

| | | | |
|---|---|---|---|
| 2,910,826 A | 11/1959 | Mansfield | |
| 5,214,920 A * | 6/1993 | Leavesley | F01D 17/143 415/157 |
| 6,035,640 A | 3/2000 | Kolmanovsky et al. | |
| 6,067,800 A | 5/2000 | Kolmanovsky et al. | |
| 6,443,696 B1 * | 9/2002 | Erdmann | F01D 17/143 415/150 |
| 6,928,816 B2 | 8/2005 | Leavesley | |
| 7,191,743 B2 | 3/2007 | Weber et al. | |
| 7,762,067 B2 | 7/2010 | Bouvier et al. | |
| 8,191,367 B2 | 6/2012 | Lombard et al. | |
| 8,506,237 B2 | 8/2013 | Japikse et al. | |
| 8,696,307 B2 * | 4/2014 | Garrett | F01D 17/143 415/157 |
| 2004/0025504 A1 | 2/2004 | Perrin et al. | |
| 2008/0271449 A1 | 11/2008 | Roberts et al. | |
| 2009/0060737 A1 * | 3/2009 | Frankenstein | F01D 17/16 415/229 |
| 2016/0090856 A1 | 3/2016 | Klauke | |

* cited by examiner

*Primary Examiner* — Patrick D Maines
*Assistant Examiner* — Dapinder Singh
(74) *Attorney, Agent, or Firm* — Goldstein Law Offices, P.C.

(57) ABSTRACT

A turbocharger adjustment device adapted to alter the performance of a variable geometry turbocharger delivering boost pressure to an engine, comprising a replacement piston cap and a movable adjustment rod. The turbocharger adjustment device integrates with the actuator controlling the opening and closing of the variable inlet through which exhaust gas from the engine passes to turn the turbine wheel and compressor of the turbocharger. The replacement piston cap replaces the cap of the actuator so that the adjustment rod extends into the actuator housing interior to abut against and restrict the movement of the piston which actuates the variable inlet, preventing the piston from opening the variable inlet. The turbocharger adjustment device prevents the decrease in boost pressure caused by the variable inlet opening in response to an increase in exhaust gas pressure, and allows the user to customize the maximum area of the variable inlet.

18 Claims, 9 Drawing Sheets

VARIABLE GEOMETRY TURBOCHARGER ADJUSTMENT DEVICE

TECHNICAL FIELD

The present disclosure relates generally to a device for modifying the performance of an internal combustion engine. More particularly, the present disclosure relates to a device which alters the performance of a variable geometry turbocharger which delivers boost pressure to an internal combustion engine.

BACKGROUND

A turbocharger improves the efficiency of an internal combustion engine by harnessing the exhaust gas produced by the engine to power a turbine, which in turn rotates a compressor to deliver compressed air to the engine to increase the power and efficiency of the engine. Conventional turbochargers have turbines with fixed sizes and their performance characteristics are limited as a result. Large turbines are capable of producing large amounts of boost pressure, but are subject to longer "spool up" times as the volume of exhaust gas produced by the engine at low engine speeds is initially insufficient to turn the turbine wheel, requiring a steady buildup of exhaust gas pressure until the turbocharger can generate boost pressure. Turbochargers with small turbines are capable of generating boost pressure at low engine speeds using small volumes of exhaust gas, but deliver poor performance at high engine speeds because the smaller turbines cannot match the ability of large turbines to harness the large volumes of exhaust gas needed to drive the compressor to produce high boost pressure.

Variable geometry turbochargers represent a significant improvement over conventional turbochargers, and are equipped with movable vanes or other structures which modify the flow of exhaust gas into the turbine. For example, the vanes pivot at low engine speeds to force the exhaust gas through a narrow inlet, and the resulting high-velocity stream of gas turns the turbine wheel. When the engine operates at high engine speeds and the exhaust gas pressure rises, the vanes pivot to increase the size of the inlet, allowing a larger volume of exhaust gas to enter the turbine to allow the turbocharger to produce more boost pressure. Variable geometry turbochargers are responsive at low engine speeds yet also capable of delivering high boost pressure at high engine speeds. The movement of the vanes is achieved using an actuator controlled by a hydraulic solenoid system or a similar equivalent, which will cause the vanes to open automatically in response to increasing exhaust gas pressure within the turbine, allowing the turbocharger to provide steadily increasing amounts of boost pressure as the vehicle accelerates. However, in certain situations, the opening of the vanes will instead cause an undesirable drop in boost pressure. For example, vehicles engaged in off-roading or towing operations require sustained boost pressure at low vehicular speeds, thus presenting an application for which the default characteristics of the turbocharger are poorly optimized. Such as user may therefore wish to restrict the maximum size of the inlet between the vanes to enable the turbocharger to deliver sustained boost pressure at low engine and vehicular speeds.

Although there are various electronic systems which allow users to exert direct control over the actuator, these require significant modification of the turbocharger and the electrical system of the vehicle itself. Furthermore, retrofitting hydraulic actuators for electronic control is often undesirable and impractical. A need therefore exists for a device which allows users to adjust the extent to which the vanes can open to prevent premature drops in boost pressure without requiring significant modification of the engine or the turbocharger itself.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a device which allows a user to alter the performance characteristics of a variable geometry turbocharger mounted on an internal combustion engine. The turbocharger harnesses exhaust gas from the engine to increase boost pressure to the engine using a compressor. The compressor is powered by a turbine assembly having a turbine wheel, a variable geometry assembly with a variable inlet adapted to move between a closed position and an open position, and a variable geometry actuator having a piston which actuates the variable geometry assembly to move the variable inlet between the closed and open positions. The variable inlet closes to increase the velocity of the exhaust gas flowing through the turbine assembly to rotate the turbine wheel, allowing the turbocharger to deliver boost pressure at low engine speeds, and opens as exhaust gas pressure increases at high engine speeds, potentially causing a premature decrease in boost pressure. Accordingly, the present disclosure provides a turbocharger adjustment device comprising a replacement piston cap and a movable adjustment rod adapted to plug directly into the housing of the variable geometry actuator. The adjustment rod extends into housing interior past the replacement piston cap to abut against the piston of the variable geometry actuator, restricting the movement of the piston and preventing the variable inlet from entering the open position as exhaust gas pressure increases within the turbine assembly.

It is another aspect of an example embodiment in the present disclosure to provide a device which allows the user to customize the maximum size of the variable inlet of the variable geometry assembly. Accordingly, the adjustment rod has a threaded segment which creates a threaded engagement with the replacement piston cap, allowing the adjustment rod to be rotatably moved to control the distance which the adjustment rod extends into the housing interior corresponding to an adjustment length, whereby the maximum area of the variable inlet is determined by the adjustment length.

It is yet another aspect of an example embodiment in the present disclosure to provide a device which does not require significant modification of the turbocharger to effect its installation. Accordingly, the replacement piston cap is adapted to match the size of the cap of the variable geometry actuator so that the cap may be removed and substituted with the replacement piston cap. Furthermore, the replacement piston cap has a sealing ring adapted to prevent gasses or fluids from escaping the housing interior and to secure the replacement piston cap within the housing opening.

It is a further aspect of an example embodiment in the present disclosure to provide a device which can be adjusted manually or mechanically. Accordingly, the turbocharger adjustment device has a handle adapted to allow the user to rotatably move the adjustment rod, and may further have an actuating motor having an actuating mechanism adapted to mechanically rotate and move the adjustment rod.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
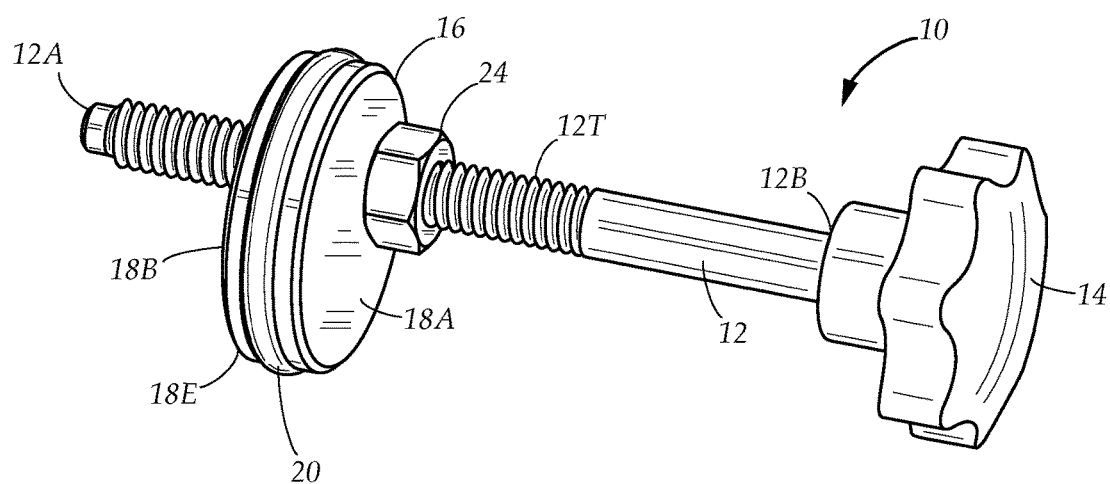
FIG. 1A is diagrammatical perspective view of a turbocharger adjustment device, in accordance with an embodiment of the present disclosure.
Figure 1B:
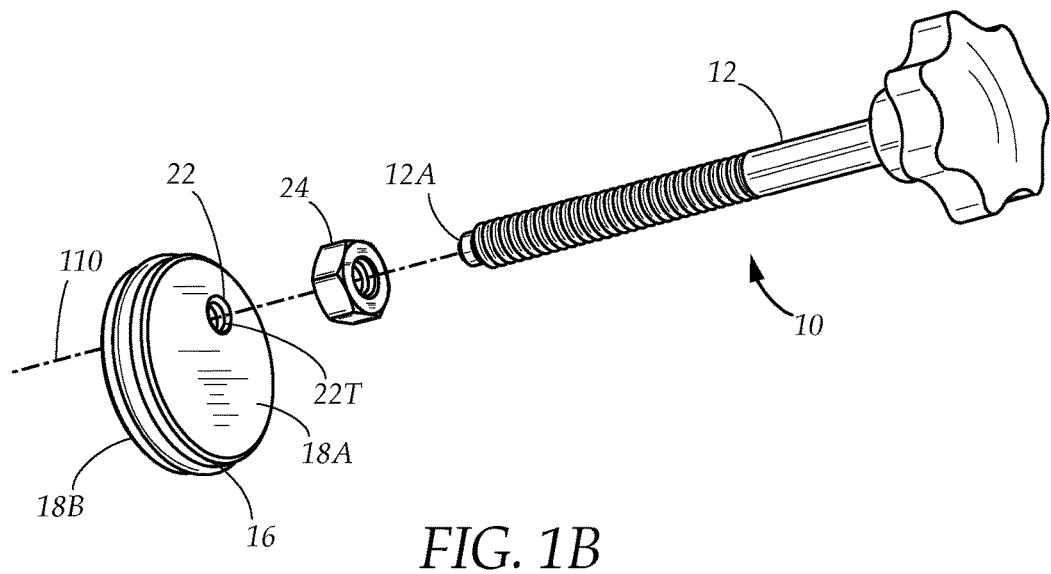
FIG. 1B is an exploded view of the turbocharger adjustment device showing a replacement piston cap, an adjustment rod, and a locking nut, in accordance with an embodiment of the present disclosure.
Figure 2A:
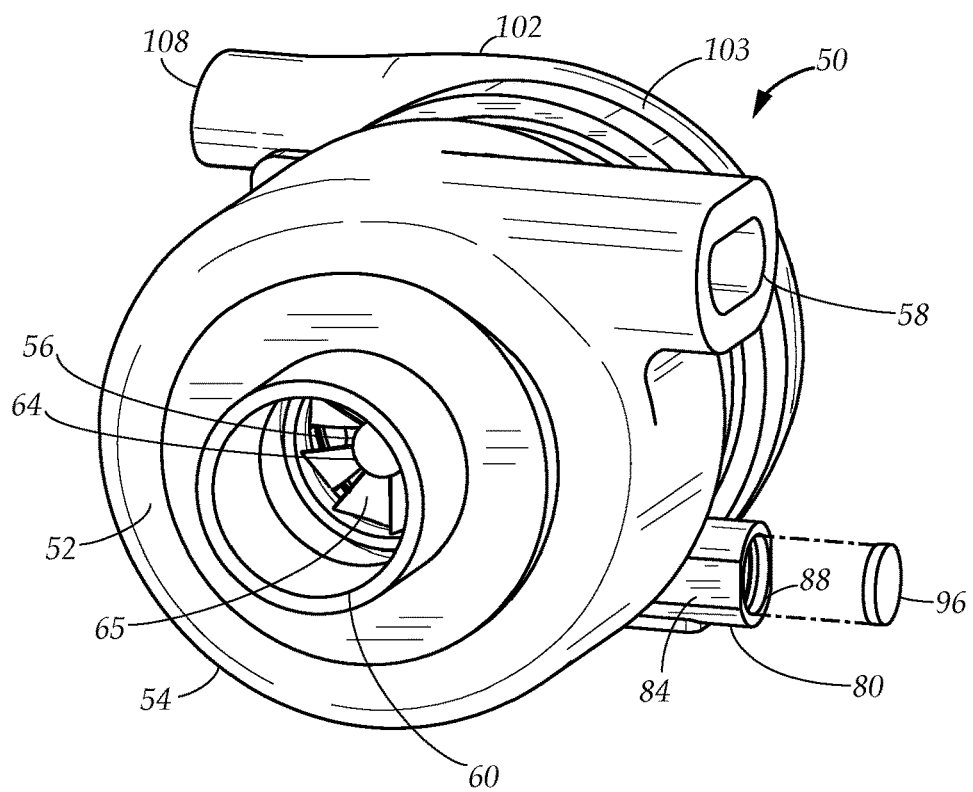
FIG. 2A is a diagrammatical perspective view of a turbocharger showing the exterior of a turbine assembly.
Figure 2B:
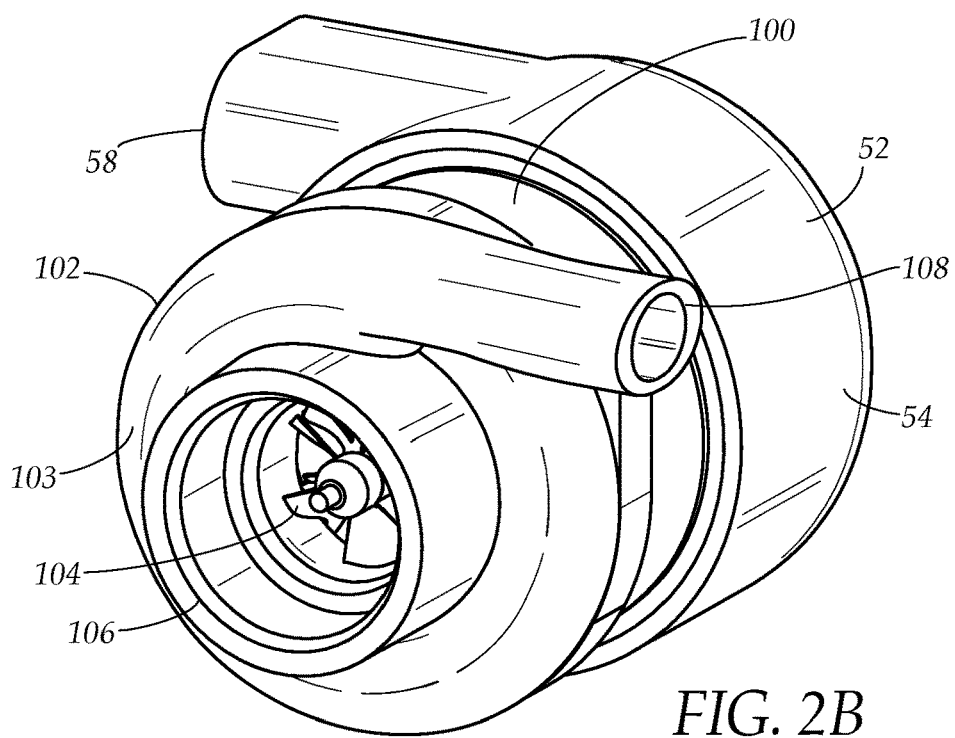
FIG. 2B is a diagrammatical perspective view of the turbocharger showing a compressor assembly.
Figure 3A:
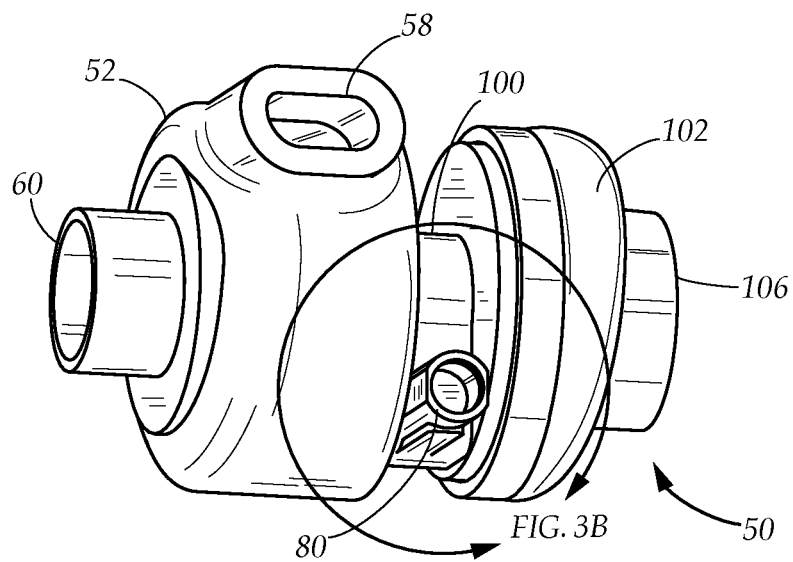
FIG. 3A is a diagrammatical perspective view of the turbocharger showing a variable geometry actuator, in accordance with an embodiment of the present disclosure.
Figure 3B:
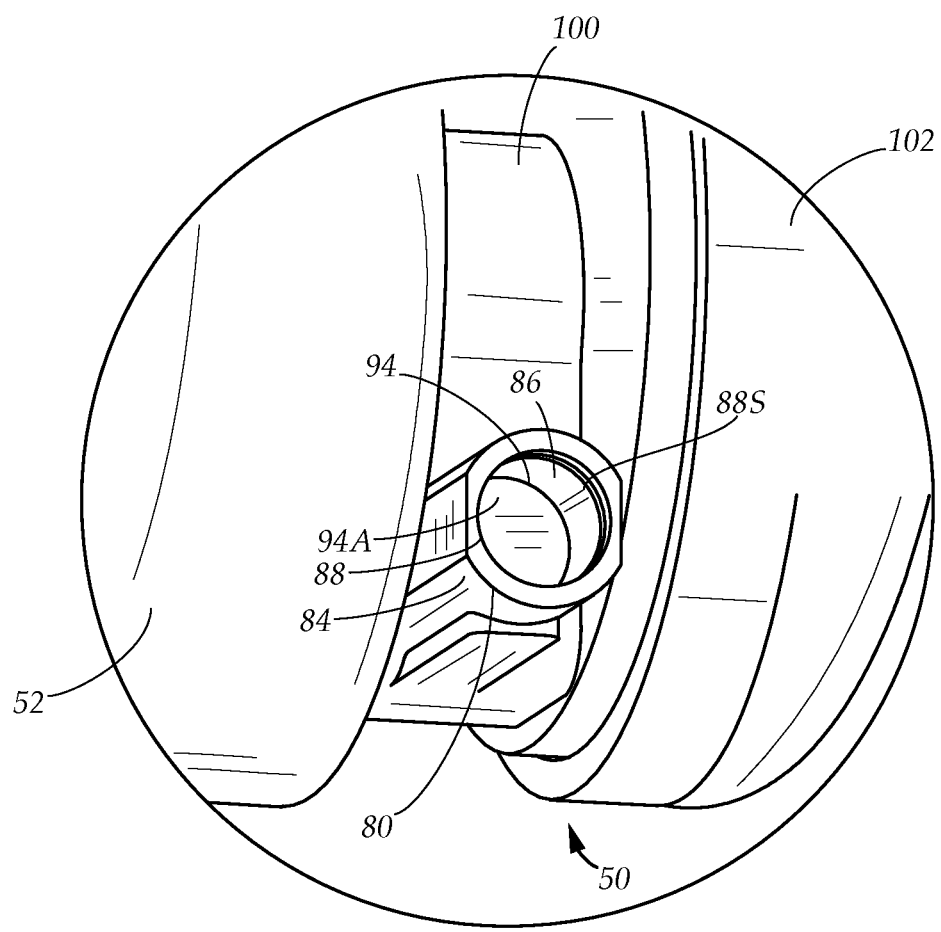
FIG. 3B is an enlarged view of the variable geometry actuator showing the actuator housing, housing interior, housing opening, and piston head within the actuator housing, in accordance with an embodiment of the present disclosure.

FIGS. 1A-B illustrate a turbocharger adjustment device 10 adapted for use with a variable geometry turbocharger 50 as shown in FIGS. 2A-B. The adjustment device 10 comprises a replacement piston cap 16 and an adjustment rod 12. The replacement piston cap 16 may be formed as a circular disk having a piston cap outer face 18A, a piston cap inner face 18B, and a piston cap outer edge 18E which extends between the piston cap inner and outer faces 18A, 18B. The replacement piston cap 16 may also have a piston cap sealing ring 20 positioned along the piston cap outer edge 18E. The replacement piston cap 16 further has an adjustment channel 22 which passes through the replacement piston cap 16 from piston cap outer face 18A to the piston cap inner face 18B. The adjustment channel 22 is adapted to accept the adjustment rod 12, allowing the first end 12A of the adjustment rod 12 to pass through the adjustment channel 22 past the piston cap inner face 18B. In a preferred embodiment, the adjustment rod 12 has a threaded segment 12T extending from the first end 12A towards the second end 12B, and the adjustment channel 22 has a threaded surface 22T adapted to create a threaded engagement between the threaded segment 12T and the adjustment channel 22. The threaded engagement allows the adjustment rod 12 to be rotatably moved within the adjustment channel 22 along an adjustment rod travel line 110 which is perpendicular to the replacement piston cap 16, further allowing the distance between the first end 12A and the piston cap inner face 18B to be selectively increased or decreased. In certain embodiments, the adjustment channel 22 is located at an off-center position between the center of the replacement piston cap and the piston cap outer edge 18E. The adjustment device 10 may also have a handle 14 attached to the second end 12B to facilitate the rotation of the adjustment rod 12 by a user, and a locking nut 24 disposed between the piston cap outer face 18A and the second end 12B adapted to engage with the threaded segment 12T to lock adjustment rod 12 in place and fix the position of the first end 12A relative to the piston cap inner face 18B.

Figure 4A:
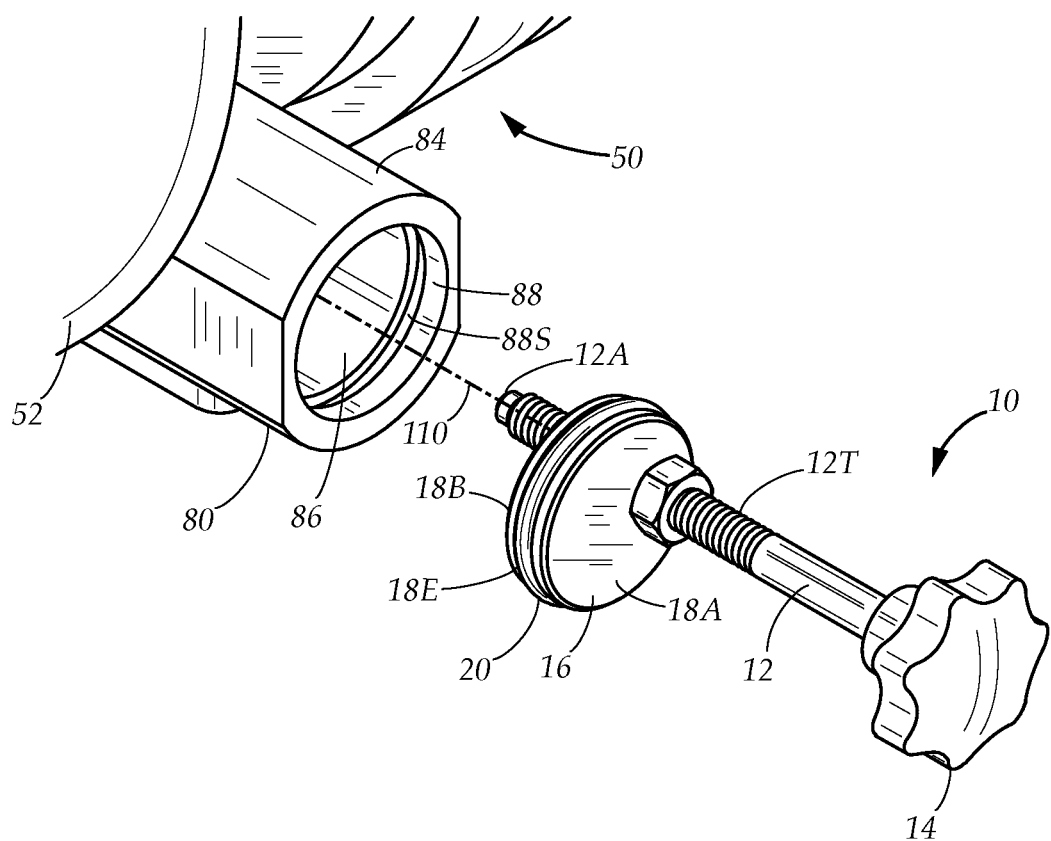
FIG. 4A is a diagrammatical perspective view of the turbocharger adjustment device positioned in front of the housing opening of the variable geometry actuator, in accordance with an embodiment of the present disclosure.
Figure 4B:
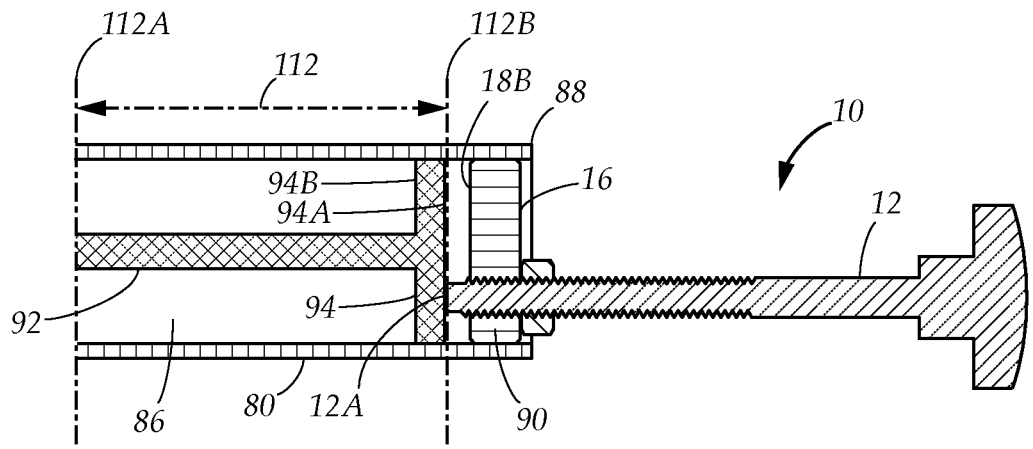
FIG. 4B is a cross section view of the turbocharger adjustment device installed in the variable geometry actuator, in accordance with an embodiment of the present disclosure.
Figure 4C:
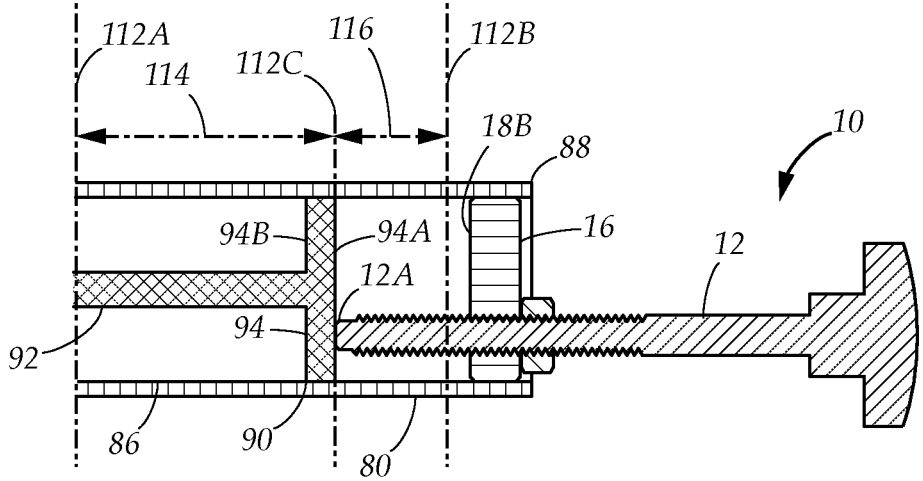
FIG. 4C is a cross section view of the turbocharger adjustment device within the variable geometry actuator, showing the first end of the adjustment rod extending into the housing interior and abutting against the piston head, in accordance with an embodiment of the present disclosure.
Figure 5:
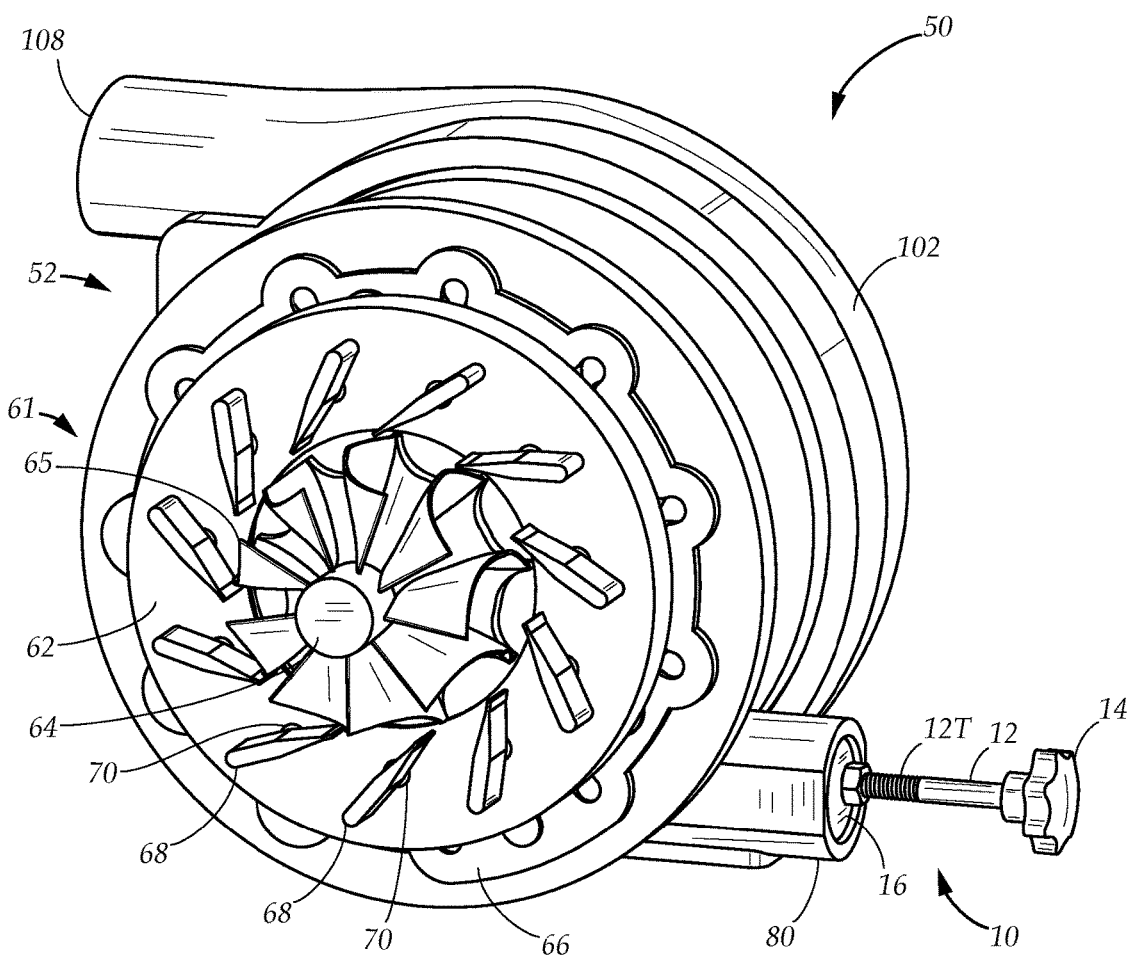
FIG. 5 is a diagrammatical perspective view of the of the turbocharger where the turbine housing cover has been removed to expose a variable geometry assembly having a plurality of pivoting vanes forming variable inlets which open and close to alter the flow of exhaust gas through the turbine assembly, in accordance with an embodiment of the present disclosure.
Figure 6:
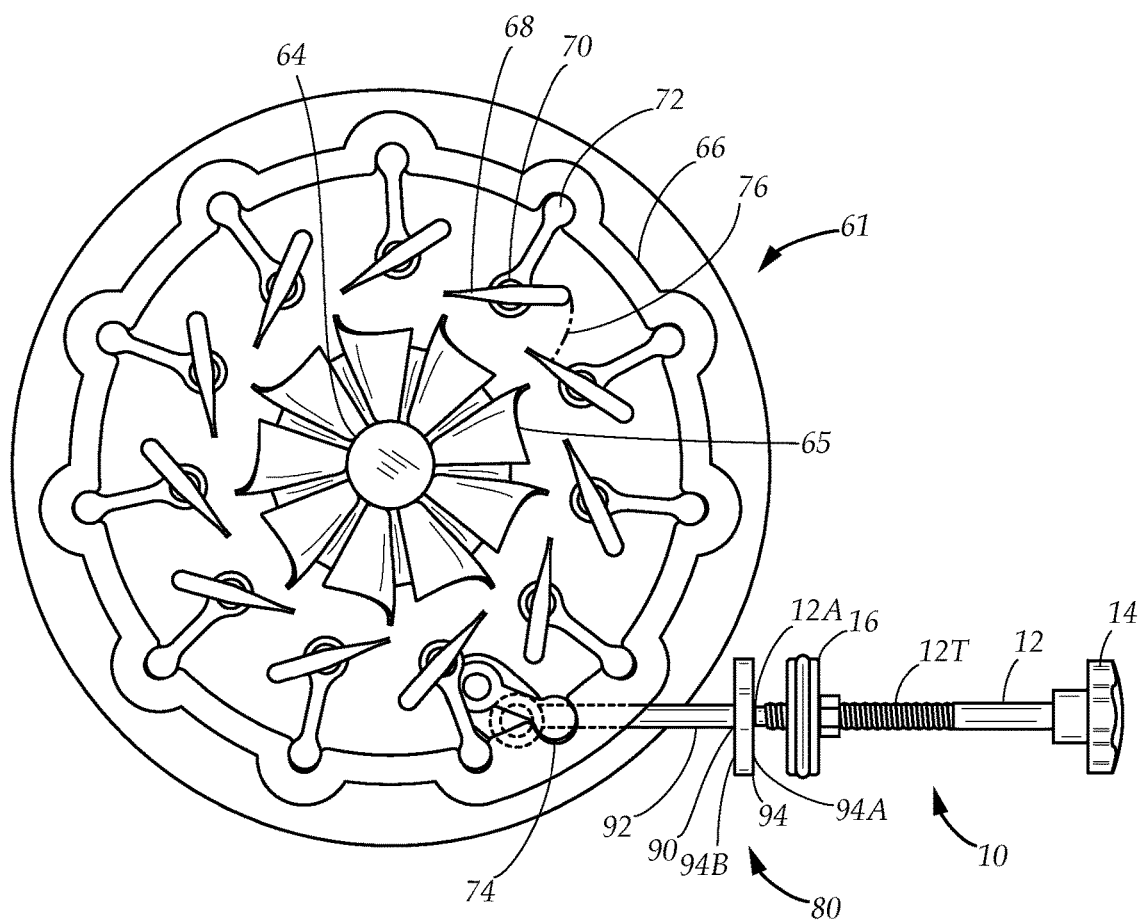
FIG. 6 is a diagrammatical side view of the variable geometry assembly operably linked to the variable geometry actuator and the turbocharger adjustment device, in accordance with an embodiment of the present disclosure.

The turbocharger depicted in FIGS. 2A-B is a standard variable geometry turbocharger with a turbine assembly 52, a compressor assembly 102, and a hub rotating assembly 100 which joins the compressor and turbine assemblies 102, 52. The turbocharger 50 is adapted to improve the efficiency and power of an internal combustion engine having one or more combustion chambers, an air intake to draw air into the combustion chambers, and an exhaust port to allow exhaust gas to exit, by harnessing the exhaust gas using the turbine assembly 52, which in turn drives the compressor assembly 102, causing the compressor to increase boost pressure by forcing compressed air into the combustion chamber via the air intake. Referring to FIG. 5 and FIG. 2A simultaneously, the turbocharger 52 further has a variable geometry assembly 61 which alters the flow of the exhaust gas through the turbine assembly 52, allowing the turbocharger 52 to increase boost pressure at low engine speeds as well as limit the boost pressure at high engine speeds. The turbocharger 50 further has a variable geometry actuator 80 which controls and actuates the variable geometry assembly 61. Referring to FIG. 2A, FIGS. 3A-B, FIG. 4A, and FIG. 6 simultaneously, the variably geometry actuator 80 may comprise an actuator housing 84 having a housing interior 86 and a housing opening 88. The housing opening 88 is covered by a cap 96 or a stopper, which may be selectively removed to expose the housing interior 86. The housing interior 86 contains an actuator piston 90 having an actuator rod 92 and a piston head 94. In the example shown, the actuator housing 84 is cylindrical in shape, and the housing opening 88 and the cap 96 are circular. As shown in FIGS. 4B-C, the actuator piston 90 is adapted to move reciprocally within the housing interior 86 such that the piston head 94 moves towards and away from the housing opening 88. The piston head 94 may move reciprocally between a first stroke position 112A and a second stroke position 112B oriented towards the housing opening 88, with the distance between the first and second stroke positions 112A, 112B corresponding to a stroke length 112. The actuator rod 92 is operably connected to the variable geometry assembly 61, as shown in FIG. 6, and is adapted to control the movement thereof. The variable geometry actuator 80 may be powered via pneumatic, hydraulic, or other actuation means as will be appreciated by a person of ordinary skill in the art in the field of the invention.

The turbocharger adjustment device 10 is adapted to interact with the variable geometry actuator 80 to allow the user to adjust the performance characteristics of the turbocharger. As shown in FIG. 2A and FIGS. 4A-C, the turbocharger adjustment device 10 is adapted to engage with the variable geometry actuator 80. The replacement piston cap 16 is adapted to replace the cap 96 of the variable geometry actuator 80, and is sized accordingly to fit securely within the housing opening 88. The cap 96 is removed to expose the housing opening 88, and the replacement piston cap 16 is inserted in its place to cover the housing opening 88 such that the piston cap inner face 18B faces the housing opening 88 and the first end 12A of the adjustment rod 12 extends towards the piston head 94. The actuator housing 84 may also have a housing sealing socket 88S positioned around the housing opening 88 which is adapted to engage with the piston cap sealing ring 20, to retain the replacement piston cap 16 in place, and prevent liquids or gasses from passing between the replacement piston cap and the housing opening 88. A person of ordinary skill in the art in the field of the invention will appreciate that the turbocharger adjustment device 10 may be adapted to interact with the variable geometry actuator 80 whether said variable geometry actuator 80 is powered via pneumatic, hydraulic, or other actuation means.

Turning now to FIG. 4B-C, the piston head 94 has a piston head top face 94A oriented towards the housing opening 88, and a piston head bottom face 94B disposed opposite to the piston head top face 94A. As the first end 12A of the adjustment rod 12 extends into the housing interior 86 past the replacement piston cap inner face 18B, the piston head top face 94A may abut against the first end 12A as the piston 90 moves reciprocally within the housing interior 86 between the first and second stroke positions 112A, 112B. The distance which the first end 12A extends into the housing interior 86 past the second stroke position 112B corresponds to an adjustment length 116, and the position of the first end 12A delineates an adjustment position 112C. Due to the abutment of the piston head 94 against the first end 12A of the adjustment rod 12, the piston head 94 cannot move along the full distance of the stroke length 112, and the piston head 94 moves instead between the first stroke position 112A and the adjustment position 112C, with the distance therebetween corresponding to a reduced stroke length 114. The user may therefore selectively increase or decrease the stroke length 112 by decreasing or increasing the adjustment length 116.

Referring to FIGS. 1A-B while continuing to refer to FIGS. 4B-C, the piston head top face 94A may have protrusions located proximate to the center of the piston head top face 94A, and the off-center position of the adjustment rod 12 and the adjustment channel 22 allows the first end 12A to avoid contacting these protrusions when abutting against the piston head 94.

Returning to FIGS. 2A-B, the turbine assembly 52 has a turbine housing cover 54 which encloses an exhaust chamber 56 and a turbine wheel 64 therein. The turbine wheel 64 has a plurality of blades 65. The turbine assembly 52 also has an exhaust inlet 58 which allows exhaust gas produced by the engine to enter into the exhaust chamber 56, and an exhaust outlet 60 which allows the exhaust gas to exit the exhaust chamber 56. The movement of the exhaust gas through the exhaust chamber 56 pushes against the blades 65 and causes the turbine wheel 64 to rotate. The compressor assembly 102 has a compressor housing 103 containing a compressor chamber and a compressor wheel 104 therein. The compressor assembly 102 further has an air inlet 106 which allows air to flow into the compressor chamber, and an air outlet which allows air to exit the compressor chamber. The turbine wheel 64 is linked to the compressor wheel 104 via the hub rotating assembly 100, and the motion of the turbine wheel 64 causes the compressor wheel to rotate, drawing air into the compressor chamber via the air inlet 106 and forcing compressed air through the air outlet 108.

Figure 7:
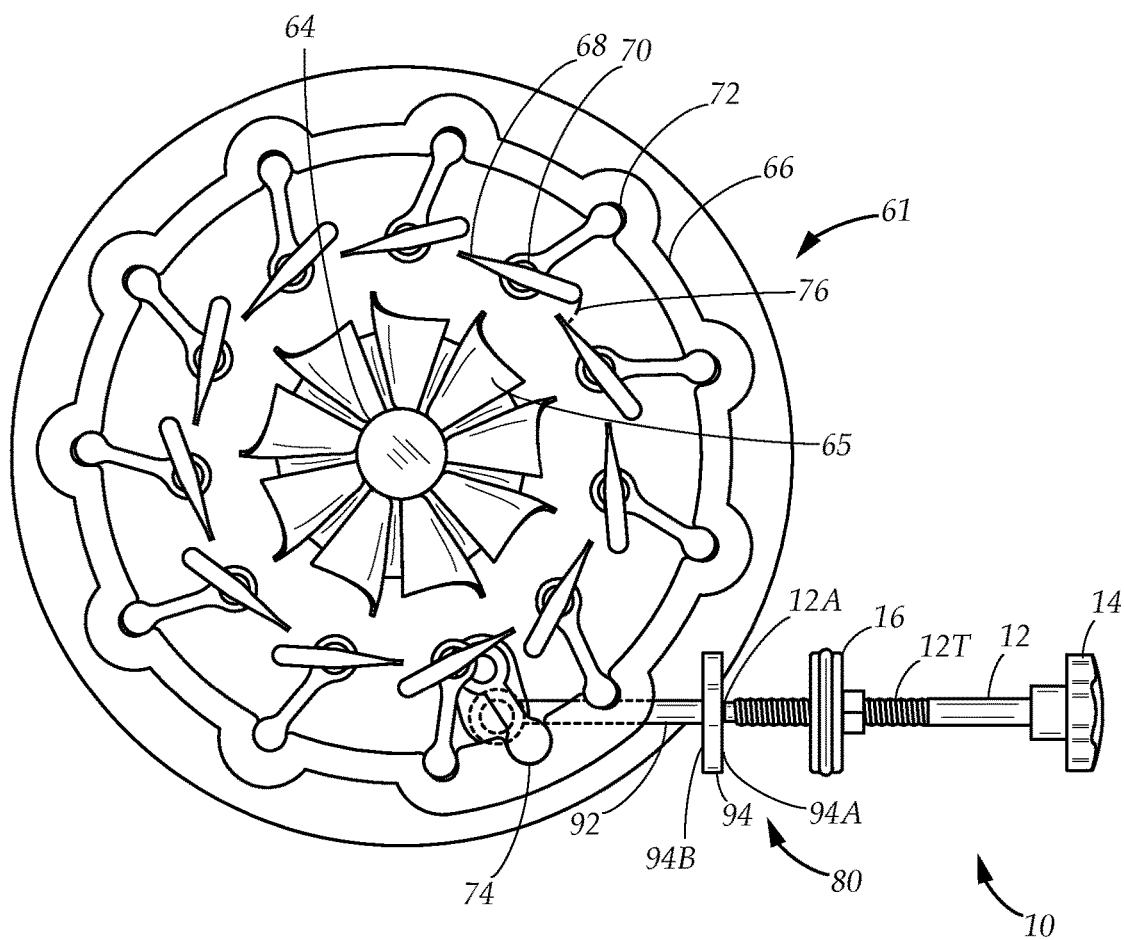
FIG. 7 is a diagrammatical side view of the variable geometry assembly, where the variable inlets are prevented from opening due to the abutment of the adjustment rod against the piston head of the variable geometry actuator, in accordance with an embodiment of the present disclosure.

Referring to FIGS. 2A-B alongside FIGS. 5-7, the variable geometry assembly 61 is housed within the turbine assembly 52, and is adapted to control the flow of the exhaust gas contacting the blades 65 of the turbine wheel 64. The variable geometry assembly 61 may comprise a plurality of vanes 68 arranged in a ring pattern surrounding the turbine wheel 64. Each vane 68 may be mounted to a plate 62 via a pin 70, allowing the vane 68 to pivot around the pin 70. The distance between neighboring vanes 68 forms a variable inlet 76 through which the exhaust gas flows to contact the blades 65 of the turbine wheel 64. By pivoting each vane 68 around its pin 70, the distance between each pair of neighboring vanes 68 can be adjusted to selectively increase or decrease the area of each variable inlet 76. Each vane 68 may pivot between an open position where the area of each variable inlet 76 is at its greatest as shown in FIG. 6, and a closed position where the area of each variable inlet 76 is at its minimum as shown in FIG. 7.

The pivoting of the vanes 68 and the resulting change in the area of each variable inlet 76 is effectuated by the variable geometry actuator 80. For example, the variable geometry assembly 61 may further have a unison ring 66 and a plurality of vane levers 72 which are connected to the actuator rod 92 via an actuator lever 74. The reciprocating motion of the actuator rod 92 causes the unison ring 66 to turn about the turbine plate 62, causing the vane levers 72 to alternately pivot the vanes 68 between the closed position and the open position.

Reducing the area of the variable inlet 76 increases the pressure and velocity of the exhaust gas flowing through the variable inlet 76 to contact the blades 65 of the turbine wheel 64, allowing the turbocharger 50 to achieve greater boost pressure when the engine is operating at low speeds, where the exhaust gas produced by the engine would otherwise generate insufficient exhaust gas pressure to drive the turbine wheel 64 and compressor wheel 104 and allow the turbocharger 50 to generate sufficient boost pressure. As the exhaust gas pressure increases, the vanes 68 will gradually pivot towards the open position to reduce exhaust backpressure resulting from an increasing volume of gas being forced through the variable inlet 76 when the area of the variable inlet 76 is small. As the exhaust gas pressure decreases, the vanes 68 may pivot back towards the closed position. The variable geometry assembly 61 may further have a controller, such as a solenoid valve or electronic sensor, which causes the variable geometry actuator 80 to actuate the vanes 68 between the closed and open positions in response to the change in the exhaust gas pressure. Note that certain variable geometry actuators may operate without a controller. For example, the exhaust gas pressure may push the piston head 94 and cause the vanes 68 to pivot towards the open position, while a spring or other mechanism counteracts the exhaust gas pressure by exerting force upon the piston head 94 to restore the vanes to the closed position.

Referring to FIG. 2A, FIGS. 4B-C, and FIGS. 6-7, the vanes 68 may be placed in the closed position by the variable geometry assembly 61 when the piston head 94 is in the first stroke position 112A. As the exhaust gas pressure within the turbine assembly 52 increases, the controller may cause the piston head 94 to gradually move towards the second stroke position 112B until the piston head 94 reaches the second stroke position 112B and the vanes are pivoted to the open position. As the exhaust gas pressure decreases, the controller may cause the piston head 94 to return towards the first stroke position 112A. However, the increasing exhaust gas pressure may cause the piston head 94 to prematurely move towards the first stroke position 112A, thereby increasing the area of the variable inlets 76, resulting in either a drop in the boost pressure, or a delay before the turbocharger can deliver the level of boost pressure that the user desires.

The turbocharger adjustment device 10 allows the user to prevent the vanes 68 from fully pivoting to the open position by restricting the stroke length 112 of the piston head 94. By moving the first end 12A of the adjustment rod 12 away from the replacement piston cap 16 and increasing the adjustment length 116, the stroke length 112 is reduced by the adjustment length 116, restricting the movement of the piston head 94 to the reduced stroke length 114. The abutment of the piston head 94 against the first end 12A of the adjustment rod 12 thereby restricts the furthest movement of the piston head 94 to the adjustment position 112C, and the adjustment position 112 therefore corresponds to an adjusted open position. The vanes 68 are prevented from fully pivoting to the open position, and the area of the variable inlets 76 may only be increased to the extent allowed by the adjusted open position. The maximum area of the variable inlets 76 is thereby reduced in proportion to the adjustment length 116. The turbocharger adjustment device 10 therefore allows the user to manually adjust the boost performance of the turbocharger without altering or modifying the operation of the controller, by setting the adjustment position to deliver the desired boost pressure. Furthermore, preventing the variable inlets 76 from entering the open position allows the turbocharger to deliver the desired boost pressure for a sustained period.

Note that the turbocharger adjustment device 10 can be adapted to function with various types of variable geometry assembly 61, including moving wall designs, as the principles of the present disclosure center around altering the flow of exhaust gas through the turbine assembly by preventing the variable inlets 76, or their equivalent structures, from fully opening by restricting the movement of the actuator piston 90 within the variable geometry actuator 80.

Figure 8:
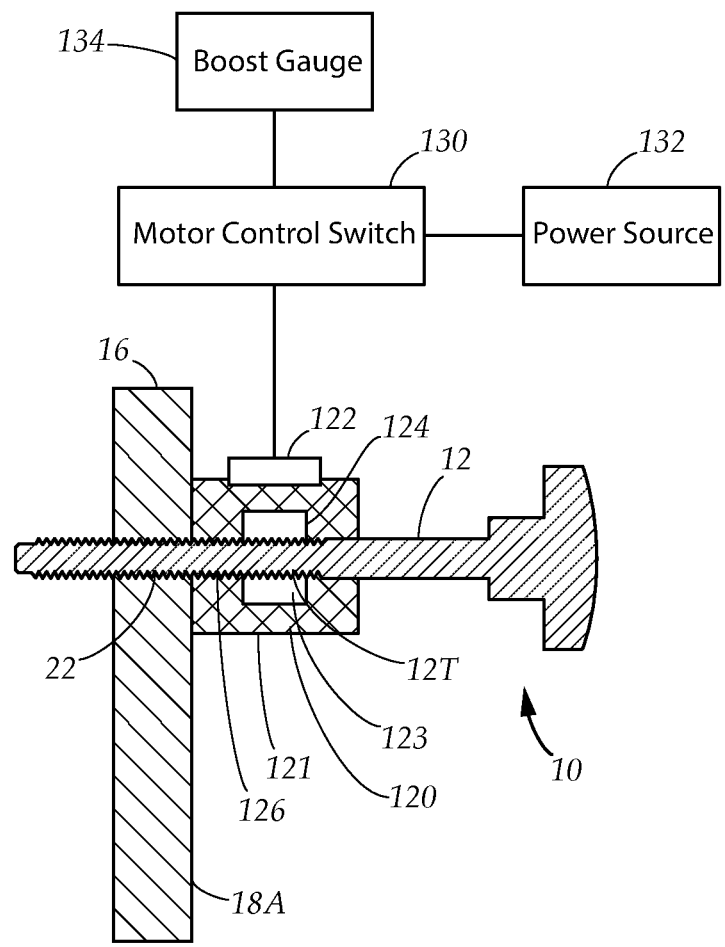
FIG. 8 is a cross section view of an embodiment of the turbocharger adjustment device with an attached actuating motor which moves the adjustment rod, in accordance with an embodiment of the present disclosure.

Turning now to FIG. 8 while also referring to FIGS. 4B-C, the turbocharger adjustment device 10 may further comprise an actuating motor 120 adapted to mechanically increase or decrease the adjustment length 116. The actuating motor 120 comprises a motor shell 121 having a motor channel 126 passing through the motor shell 121 which is adapted to receive the adjustment rod 12. The actuating motor 120 further comprises an actuating mechanism 124 positioned at the motor channel 126 adapted to move the adjustment rod 12 and selectively increase or decrease the adjustment length 116, a motor component 123 to drive the actuating mechanism 124, and a motor control circuit 122 operably connected to the motor component 123. The actuating mechanism 124 can be a worm gear or other similar mechanism which engages with the threaded segment 12T of the adjustment rod 12 and allows the actuating motor to rotatably move the adjustment rod 12. The motor control circuit 122 is operably connected to a motor control switch 130 and a power source 132, allowing the user to operate the motor control switch 130 to selectively increase or decrease the adjustment length 116. The motor control switch 130 may also be electronically operated and adapted to function without the user's direct manual control. For example, the motor control switch 130 may be adapted to operate in conjunction with a boost gauge 134 which measures the boost pressure of the air being fed to the engine such that the actuating motor 120 automatically activates to prevent a drop in boost pressure caused by the increase in the area of the variable inlets.

In a preferred embodiment, the actuating motor 120 is affixed to the piston cap outer face 18A and oriented such that the motor channel 126 is aligned with the adjustment channel 122. In an alternate embodiment, the replacement piston cap 16 may be adapted to house the actuating motor 120 and its components, and the actuating mechanism 124 may instead be adapted to engage with the adjustment rod 12 at the adjustment channel 22 instead of the motor channel 126. The replacement piston cap 16 may further serve the same function as the motor shell 121 in housing the motor control circuit 122, motor component 123, and actuating mechanism 124.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a turbocharger adjustment device. The disclosure is illustrated by example in the drawing figures, and throughout the written description. It should be understood that numerous variations are possible, while adhering to the inventive concept. Such variations are contemplated as being a part of the present disclosure.

What is claimed is:

1. A turbocharger adjustment device adapted to operate with a variable geometry turbocharger and an internal combustion engine, the engine having a combustion chamber, and an air intake and an exhaust port linked thereto, the turbocharger comprising a turbine assembly having a turbine wheel adapted to rotate when exposed to a flow of exhaust gas exiting the engine through the exhaust port, and a compressor rotatably linked to and adapted to rotate in unison with the turbine wheel to force compressed air to the combustion chamber of the engine via the air intake, the turbocharger further comprising a variable inlet interposed between the flow of exhaust gas and the turbine wheel, the variable inlet having an area and is adapted to actuate between an open position where the area is at its greatest and a closed position where the area is at its smallest, the turbocharger further comprising an actuator having an actuator housing having a housing interior, a housing opening, and a cap covering the housing opening, the housing interior containing a piston head and a piston rod adapted to move reciprocally between a first stroke position and a second stroke position to actuate the variable inlet between the closed and open positions and the distance between the first and second stroke positions correspond to a stroke length, the turbocharger is adapted to increase the boost pressure of the compressed air by directing the flow of exhaust gas through the variable inlet in the closed position to increase the velocity of the exhaust gas contacting the turbine wheel at low engine speeds, and limit the boost pressure by actuating the variable inlet towards the open position as the pressure of the exhaust gas increases at high engine speeds, the turbocharger adjustment device comprising:

a replacement piston cap having a piston cap outer face, a piston cap inner face disposed opposite the piston cap outer face, and a piston cap outer edge extended between the piston cap inner face and the piston cap outer face, the replacement piston cap further having an adjustment channel, the replacement piston cap is adapted to replace the cap of the actuator housing and cover the housing opening; and an adjustment rod having a first end and a distally oriented second end, the adjustment rod is adapted to pass through the adjustment channel so the first end extends past the piston cap inner face into the housing interior, the distance which the first end extends into the housing interior past the second stroke position corresponds to an adjustment length, the adjustment rod is further adapted to move within the adjustment channel so that the adjustment length is selectively increased or decreased, the adjustment rod is adapted to prevent the loss of boost pressure caused by the actuating of the variable inlet towards the open position resulting from the increase in the pressure of the exhaust gas, whereby the first end is adapted to abut against the piston head as the piston moves towards the second stroke position to reduce the stroke length by the adjustment length so that the variable inlet is prevented from entering into the open position.

2. The turbocharger adjustment device as described in claim 1, wherein:

the adjustment channel of the replacement piston cap has a threaded surface; and the adjustment rod further has a threaded segment extending from the first end towards the second end, the threaded segment and the threaded surface create a threaded engagement allowing the adjustment rod to be rotatably moved within the adjustment channel to selectively increase or decrease the adjustment length.

3. The turbocharger adjustment device as described in claim 2, wherein the replacement piston cap is formed as a circular disk.

4. The turbocharger adjustment device as described in claim 3, wherein the replacement piston cap further has a sealing ring disposed along the piston cap outer edge.

5. The turbocharger adjustment device as described in claim 4, further comprising:

an actuating motor having a motor shell and a motor channel passing through the motor shell adapted to receive the adjustment rod, the actuating motor further having an actuating mechanism adapted to rotatably move the adjustment rod to selectively increase or decrease the adjustment length.

6. The turbocharger adjustment device as described in claim 5, wherein the actuating motor is positioned against the piston cap outer face and the motor channel is aligned with the adjustment channel.

7. The turbocharger adjustment device as described in claim 4, wherein the adjustment rod further has a handle attached to the second end, the handle is adapted to allow a user to rotatably move the adjustment rod to selectively increase or decrease the adjustment length.

8. The turbocharger adjustment device as described in claim 7, wherein the replacement piston cap has a central point and the adjustment channel is positioned between the central point and the piston cap outer edge in an off-center position.

9. The turbocharger adjustment device as described in claim 8, further comprising a locking nut adapted to engage with the adjustment rod between the piston cap outer face and the second end, the locking nut is adapted to lock the adjustment rod in place to fix the adjustment length.

10. An adjustable variable geometry turbocharging system adapted to operate with an internal combustion engine having a combustion chamber, and an air intake and an exhaust port linked to the combustion chamber, the exhaust port allowing exhaust gas to exit the combustion chamber, the system comprising:
   a variable geometry turbocharger having:
      a turbine assembly having a turbine wheel adapted to rotate when exposed to a flow of exhaust gas exiting the engine through the exhaust port;
      a compressor rotatably linked to and adapted to rotate in unison with the turbine wheel to force compressed air to the combustion chamber of the engine via the air intake;
      a variable geometry assembly having a variable inlet interposed between the flow of exhaust gas and the turbine wheel, the variable inlet having an area and is adapted to actuate between an open position where the area is at its greatest and a closed position where the area is at its smallest;
      an actuator having an actuator housing having a housing interior, a housing opening, and a cap covering the housing opening, the housing interior containing a piston head and a piston rod adapted to move reciprocally between a first stroke position and a second stroke position to actuate the variable inlet between the closed and open positions and the distance between the first and second stroke positions correspond to a stroke length; and
      wherein the turbocharger is adapted to increase the boost pressure of the compressed air by directing the flow of exhaust gas through the variable inlet in the closed position to increase the velocity of the exhaust gas contacting the turbine wheel at low engine speeds, and limit the boost pressure by actuating the variable inlet towards the open position as the pressure of the exhaust gas increases at high engine speeds; and
   a turbocharger adjustment device having:
      a replacement piston cap having a piston cap outer face, a piston cap inner face disposed opposite the piston cap outer face, and a piston cap outer edge extended between the piston cap inner face and the piston cap outer face, the replacement piston cap further having an adjustment channel, the replacement piston cap is adapted to replace the cap of the actuator housing and cover the housing opening; and
      an adjustment rod having a first end and a distally oriented second end, the adjustment rod is adapted to pass through the adjustment channel so the first end extends past the piston cap inner face into the housing interior, the distance which the first end extends into the housing interior past the second stroke position corresponds to an adjustment length, the adjustment rod is further adapted to move within the adjustment channel so that the adjustment length is selectively increased or decreased, the adjustment rod is adapted to prevent the loss of boost pressure caused by the actuating of the variable inlet towards the open position resulting from the increase in the pressure of the exhaust gas, whereby the first end is adapted to abut against the piston head as the piston moves towards the second stroke position to reduce the stroke length by the adjustment length so that the variable inlet is prevented from entering into the open position.

11. The system as described in claim 10, wherein:
the adjustment channel of the replacement piston cap has a threaded surface; and
the adjustment rod further has a threaded segment extending from the first end towards the second end, the threaded segment and the threaded surface create a threaded engagement allowing the adjustment rod to be rotatably moved within the adjustment channel to selectively increase or decrease the adjustment length.

12. The system as described in claim 11, wherein the replacement piston cap is formed as a circular disk.

13. The system as described in claim 12, wherein the replacement piston cap further has a sealing ring disposed along the piston cap outer edge.

14. The system as described in claim 13, wherein the turbocharger adjustment device further comprises:
   an actuating motor having a motor shell and a motor channel passing through the motor shell adapted to receive the adjustment rod, the actuating motor further having an actuating mechanism adapted to rotatably move the adjustment rod to selectively increase or decrease the adjustment length.

15. The system as described in claim 14, wherein the actuating motor is positioned against the piston cap outer face and the motor channel is aligned with the adjustment channel.

16. The system as described in claim 13, wherein the adjustment rod further has a handle attached to the second end, the handle is adapted to allow a user to rotatably move the adjustment rod to selectively increase or decrease the adjustment length.

17. The system as described in claim 16, wherein the replacement piston cap has a central point and the adjustment channel is positioned between the central point and the piston cap outer edge in an off-center position.

18. The system as described in claim 17, wherein the turbocharger adjustment device further has a locking nut adapted to engage with the adjustment rod between the piston cap outer face and the second end, the locking nut is adapted to lock the adjustment rod in place to fix the adjustment length.

* * * * *